(12) United States Patent
Miyajima

(10) Patent No.: US 8,769,040 B2
(45) Date of Patent: Jul. 1, 2014

(54) SERVICE PROVIDING SYSTEM, A VIRTUAL MACHINE SERVER, A SERVICE PROVIDING METHOD, AND A PROGRAM THEREOF

(75) Inventor: Hiroaki Miyajima, Tokyo (JP)

(73) Assignee: NEC Corporation, Tokyo (JP)

( * ) Notice: Subject to any disclaimer, the term of this patent is extended or adjusted under 35 U.S.C. 154(b) by 478 days.

(21) Appl. No.: 13/049,042

(22) Filed: Mar. 16, 2011

(65) Prior Publication Data

US 2011/0239216 A1    Sep. 29, 2011

(30) Foreign Application Priority Data

Mar. 23, 2010 (JP) ................................. 2010-065708

(51) Int. Cl.
G06F 15/16 (2006.01)
(52) U.S. Cl.
USPC .......................................... 709/217; 709/245
(58) Field of Classification Search
USPC ................................................ 709/217, 245
See application file for complete search history.

(56) References Cited

U.S. PATENT DOCUMENTS

| | | | | |
|---|---|---|---|---|
| 6,445,704 | B1 * | 9/2002 | Howes et al. | 370/392 |
| 7,257,815 | B2 * | 8/2007 | Gbadegesin et al. | 718/104 |
| 7,996,834 | B2 * | 8/2011 | Araujo et al. | 718/1 |
| 8,015,288 | B2 * | 9/2011 | Miyajima | 709/225 |
| 8,312,154 | B1 * | 11/2012 | Cabrera et al. | 709/229 |
| 2002/0143953 | A1 * | 10/2002 | Aiken, Jr. | 709/227 |
| 2002/0143965 | A1 * | 10/2002 | Aiken, Jr. | 709/229 |
| 2009/0259759 | A1 * | 10/2009 | Miyajima | 709/229 |
| 2009/0260007 | A1 * | 10/2009 | Beaty et al. | 718/1 |
| 2010/0241734 | A1 * | 9/2010 | Miyajima | 709/219 |
| 2011/0131330 | A1 * | 6/2011 | Beaty et al. | 709/227 |

OTHER PUBLICATIONS

Communication dated Apr. 1, 2014, issued by the Japanese Patent Office in corresponding Application No. 2010-065708.

* cited by examiner

*Primary Examiner* — Douglas Blair
(74) *Attorney, Agent, or Firm* — Sughrue Mion, PLLC

(57) ABSTRACT

A service providing system has a virtual machine server and one or more client terminals. The virtual machine server has one or more virtual machines and a virtual machine system unit which controls the virtual machines. The virtual machine system unit classifies the client terminals into groups. Each of the virtual machines provides a service to each of the terminals in a group in response to receiving a request for the service from one of the client terminals in the group of terminals.

6 Claims, 6 Drawing Sheets

FIG. 2

SERVICE DEFINITION LIST

224

| SERVICE IDENTIFIER | IP ADDRESS | PORT NUMBER LIST | VIRTUAL MACHINE START-UP COMMAND |
|---|---|---|---|
| Service_a | 11.22.33.44 | 1234. 1235-1239 | Launch_a |
| Service_b1 | 11.22.33.44 | 1357 | Launch_b1 |
| Service_b2 | 11.22.33.55 | 1357 | Launch_b2 |

FIG. 3

GROUP DEFINITION LIST

226

| GROUP IDENTIFIER | IP ADDRESS LIST | PORT NUMBER LIST | CORRESPONDING SERVICE LIST |
|---|---|---|---|
| Group_x | 22.33.44.0/24 | all | Service_a,Service_b1 |
| Group_y1 | 33.44.55.66 | 1001-2000 | Service_a,Service_b1 |
| Group_y2 | 33.44.55.66 | 2001-3000 | Service_b2 |

FIG. 4

SERVICE TRANSFER MANAGEMENT TABLE

2221#1

| SERVICE IDENTIFIER | GROUP IDENTIFIER | VIRTUAL MACHINE IDENTIFIER | MAC ADDRESS |
|---|---|---|---|
| Service_a | Group_x | VM1 | 10:20:30:40:50:70 |
| Service_a | Group_y1 | VM2 | 10:20:30:40:50:71 |
| Service_b1 | Group_x | VM3 | 10:20:30:40:50:72 |

2221#2

| SERVICE IDENTIFIER | GROUP IDENTIFIER | VIRTUAL MACHINE IDENTIFIER | MAC ADDRESS |
|---|---|---|---|
| Service_b2 | Group_y2 | VM4 | 10:20:30:40:50:90 |

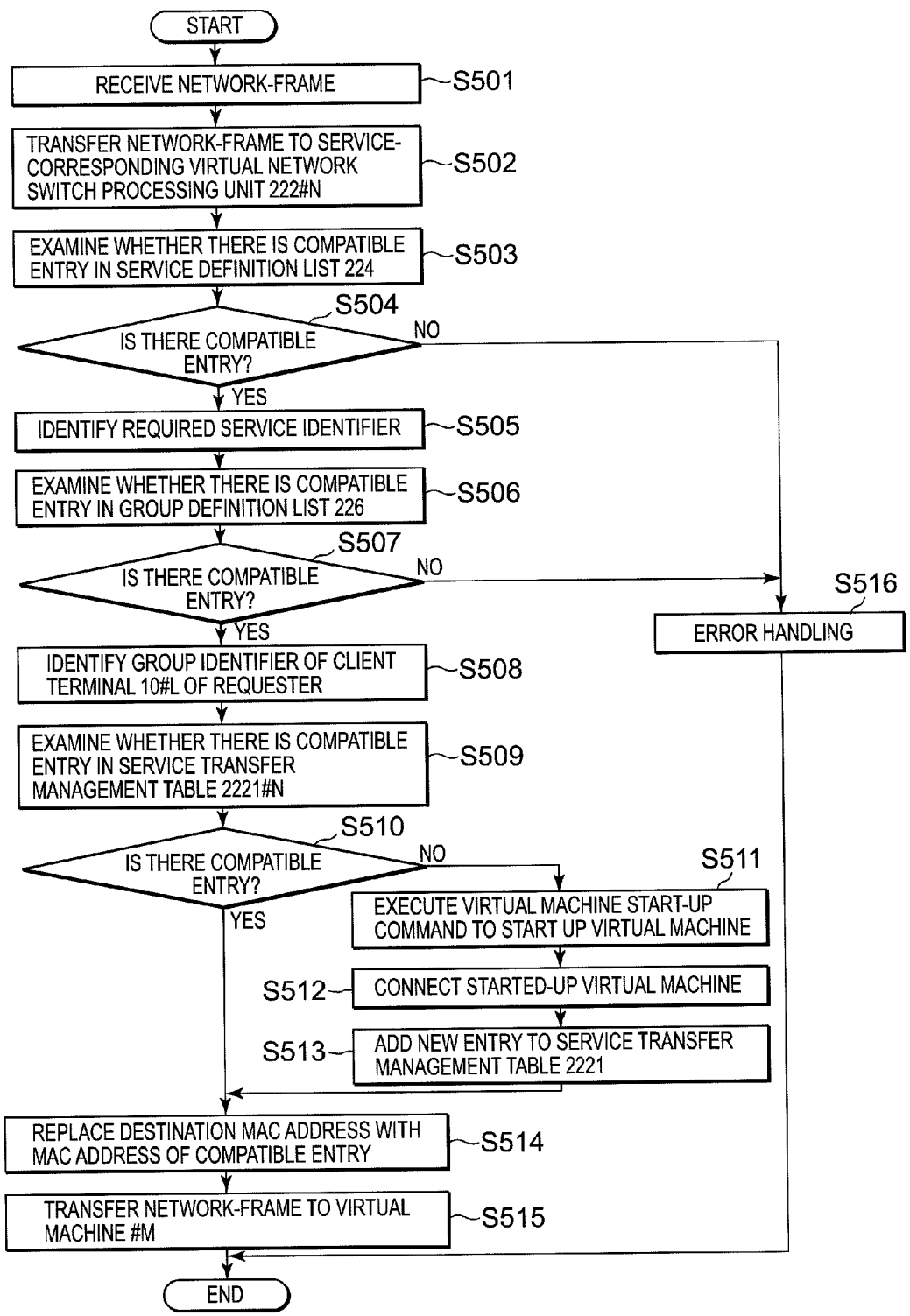

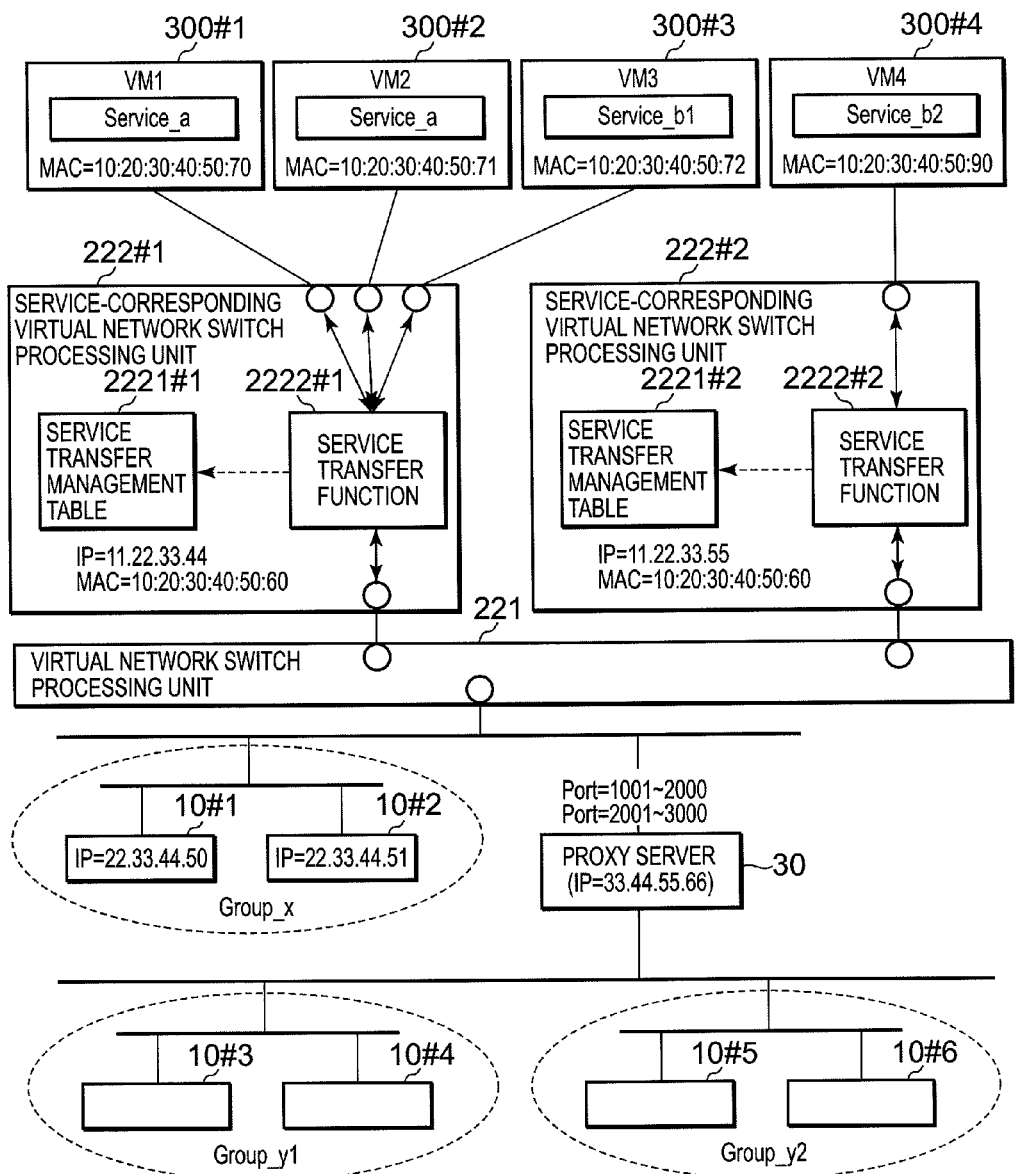

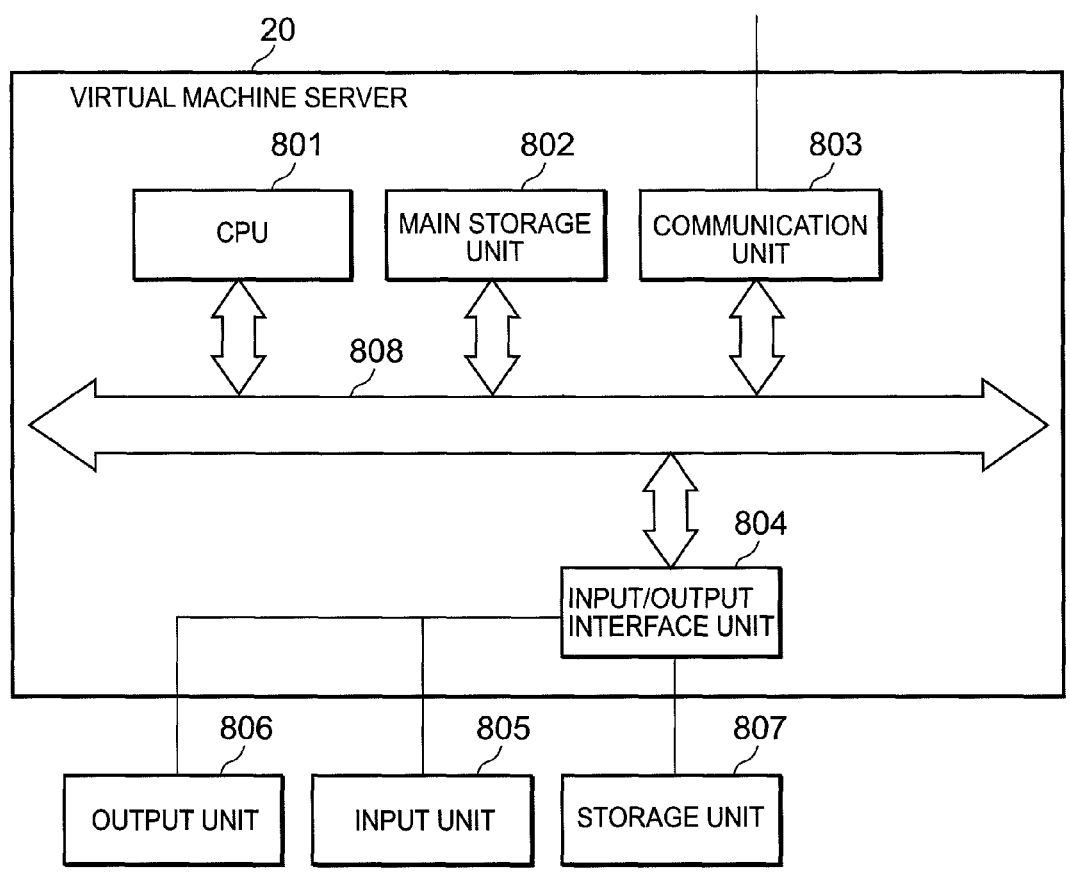

SERVICE PROVIDING SYSTEM, A VIRTUAL MACHINE SERVER, A SERVICE PROVIDING METHOD, AND A PROGRAM THEREOF

This application is based upon and claims the benefit of priority from Japanese patent application No. 2010-065708, filed on Mar. 23, 2010, the disclosure of which is incorporated herein in its entirety by reference.

BACKGROUND

The present invention relates to a service providing system, a virtual machine server, a service providing method and a program thereof. More particularly, it relates to a service providing system, a virtual machine server, a service providing method and a program thereof capable of efficiently operating a virtual machine in accordance with services to be delivered.

In related technology, with a development of high performance PC (personal computer) server machines, virtual machine systems have been developed in which virtual machines virtualize computers.

The virtual machine systems are platforms which operate on physical machines, and cause plural virtual machines to operate.

Virtual machines have, for a long time, been implemented on large-scale computers and their main objective is to effectively take advantage of computer resources through computer-resource intensive utilization. In this case, instead of using plural computers, a virtual machine system is operated on one computer in such a manner that plural virtual computers can be run on the virtual machine system.

A virtual machine system installed on a PC sever is often employed for the purpose of computer-resource intensive utilization. In addition, recently in the virtual machine systems installed on PC servers, a virtual machine migration system has been developed. In the virtual machine migration system, a virtual machine on the virtual machine system is transferred onto another virtual machine system while the virtual machine keeps running intact. This kind of the virtual machine migration is developed for the purpose of optimizing computer resources etc.

Virtual machine migration is useful for increasing the flexibility of service environments. For example, if it becomes necessary to take security into consideration while a service is provided, a virtual machine which is providing the service can be migrated to a more secure location.

For example, Japanese Unexamined Patent Application Publication No. 2009-265894, Japanese Unexamined Patent Application Publication No. Hei05(1993)-088922 and Japanese Unexamined Patent Application Publication (Translation of PCT Application) No. 2007-506169 disclose these related technologies.

On the other hand, in virtual machine migration, it is necessary for a client, which is using the virtual machine, to continuously be provided with the same service as the client is provided before the migration. This inhibits increasing the flexibility of virtual machine migration.

For example, there is a problem in the related technologies, in that if one of a plurality clients which is provided with a service can not access the virtual machine after the virtual machine is migrated to a secure location, such a migration should be not executed because the service should be provided to the plurality of clients continuously before and after the migration of the virtual machine. That is to say, in this situation, it is impossible to migrate the virtual machine to a secure location if one of the plurality of clients can not access the virtual machine.

SUMMARY OF THE INVENTION

An object of certain embodiments of the invention is to provide a service providing system, a virtual machine server, a service providing method, and a program thereof capable of increasing the flexibility of a virtual machine migration.

A non-limiting feature of certain embodiments of the invention is to provide a service providing system having a virtual machine server configured to comprise one or more virtual machines which provide services and a virtual machine system which controls the virtual machines; and one or more client terminals configured to request a service to the virtual machines. The virtual machine system classifies the client terminals into groups and the virtual machine provides the service to each of the groups on receipt of the request.

Another non-limiting feature of certain embodiments of the invention is to provide a virtual machine server having: one or-more virtual machines configured to provide services; and a virtual machine system configured to control the virtual machines and classify one or more client terminals into groups. The virtual machine provides the service to each of the groups on receipt of the request from a client terminal.

Another non-limiting feature of certain embodiments of the invention is to provide a service providing method that: controls one or more virtual machines; classifies client terminals into groups; the virtual machine providing a service to each of the groups on receipt of a request from the client terminal.

Another non-limiting feature of certain embodiments of the invention is to provide a computer-readable medium having stored thereon a program product that when executed by a processor performs the method comprising: classifying client terminals into groups; and controlling a virtual machine, configured to provide a service, to provide the service to each of the client terminals in a group in response to receipt of a request from one of the client terminals in the group.

BRIEF DESCRIPTION OF THE DRAWING

The above and other aspects of the present invention will become more apparent by describing in detail exemplary embodiment thereof with reference to attached drawings in which:

FIG. 2 is a diagram showing a configuration example of a service definition list.

FIG. 3 is a diagram showing a configuration example of a group definition list.

FIG. 4 is a diagram showing a configuration example of a service transfer management table.

FIG. 5 is a flowchart showing processing operations performed on a network-frame by a virtual machine server 20.

FIG. 6 is a block diagram showing a configuration of a service providing system.

FIG. 7 is a block diagram showing a hardware configuration example of a virtual machine server.

DETAILED DESCRIPTION

Figure 1:
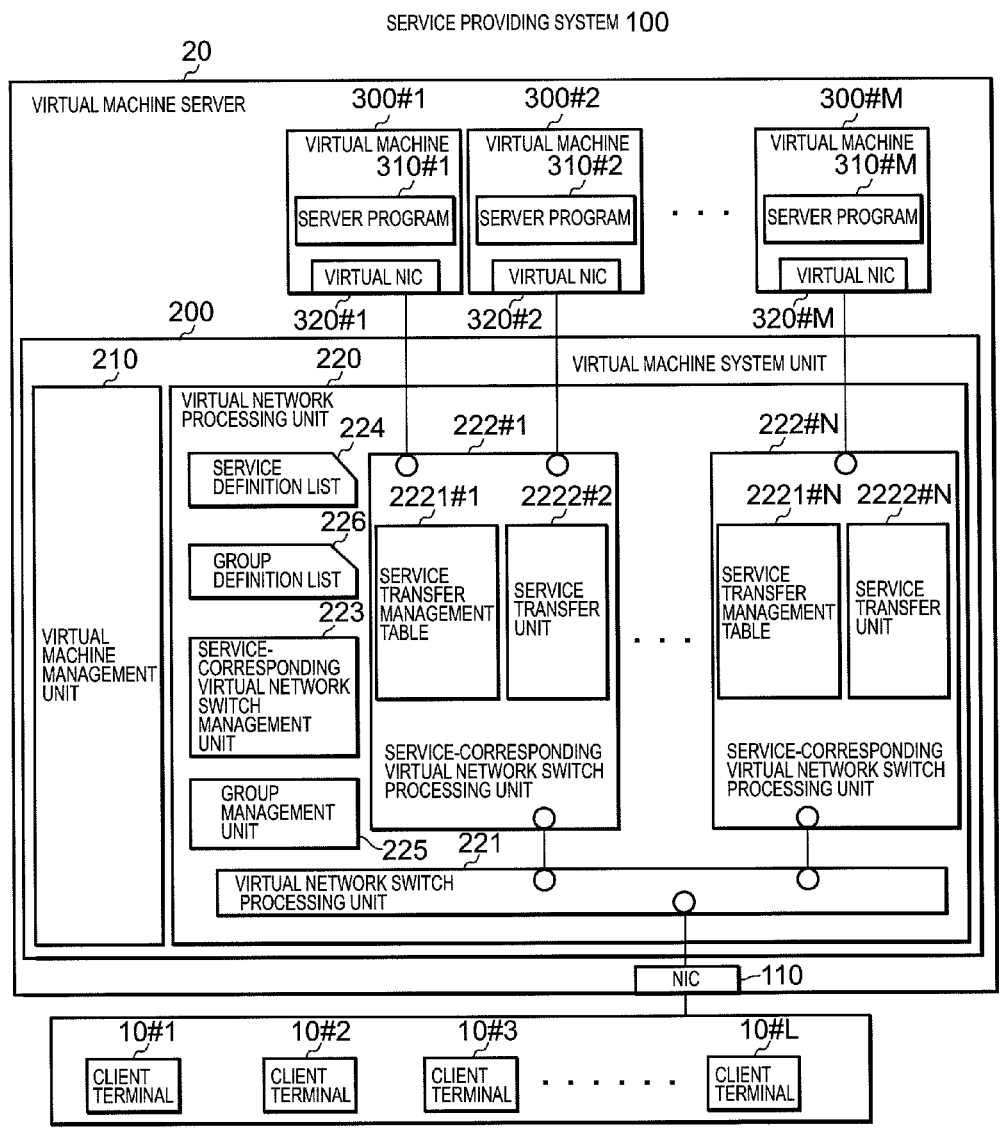
FIG. 1 is a block diagram showing a configuration of a service providing system according to a first embodiment of the present invention.

Various embodiments of the present invention will be described below in detail with reference to drawings. In the following descriptions, similar components are given similar reference numerals through all the drawings, and repeated explanations regarding the similar components will be appropriately omitted.

In these embodiments, when a virtual machine which is providing a plurality of clients with a service is migrated to a secure location where one of the plurality of clients cannot access the virtual machine, it is possible for the client to be continuously provided with the service both before and after the migration of the virtual machine.

(First Embodiment)

Firstly, a first embodiment of the present invention will be described in detail with reference to the drawings. In the following descriptions, the configurations of portions that are not relevant to the nature of the present invention will be omitted and not shown.

According to FIG. 1, a service providing system 100 according to the first embodiment includes a virtual machine server 20 and one or more client terminals 10#1 to #L. One or more client terminals 10#1 to #L are connected to the virtual machine server 20 via a network.

Here, "L" is a natural number greater than or equal to unity, and "#1 to #L" indicates the number of the client terminals.

The virtual machine server 20 includes one or more virtual machines 300#1 to 300#M that are virtual computers; a virtual machine system unit 200 that is a platform for controlling the virtual machine server 20 and for causing the virtual machines 300 to operate as well; and a NIC (network interface card) 110 that is used for connection to the network.

Here, "M" is a natural number greater than or equal to unity, and "#1 to #M" indicates the number of the client terminals 300.

The virtual machine server 20 is made from typical computer hardware, and also includes base components such as a CPU, a memory, and I/O devices such as a disk. However these components and devices are not shown and only the NIC (network interface card) 110 is shown in the figure for the sake of convenience.

The virtual machine system unit 200 functions to control the virtual machine server 20. The virtual machine system 200 has the same function as an operating system (OS) has regarding the control of the virtual machine server 20.

In addition, the virtual machine system 200 has a function to work as a platform that causes the virtual machines 300#1 to 300#M to operate.

The virtual machine system 200 includes: a virtual machine management unit 210 that performs the creation and release, start-up and stop, monitoring, schedule management, and the like of the virtual machines 300#M; and a virtual network processing unit 220 that provides a virtual network function for the virtual machines 300#M.

In addition, the virtual machine system 200 has a memory management function for the virtual machine 300#M, and a storage management function for the virtual machine 300#M although they are not shown in FIG. 1. Because a memory management function and a storage management function are well known by those skilled in the art and they are not directly relevant to the present invention, detailed descriptions regarding them will be omitted.

The virtual machine 300#M is a virtual computer, and typically composed of a virtual CPU, a virtual memory, a virtual NIC, a virtual disk, and the like.

The virtual machine 300#M includes a server program 310#M that is software running on the virtual machine 300#M itself to provide some function, and a virtual NIC 320#M that is a virtual network card.

The virtual network processing unit 220 has a virtual network function for the virtual machine 300#M.

The virtual network processing unit 220 includes a virtual network switch 221, a service definition list 224, one or more service-corresponding virtual network switch processing units 222#1 to 222#N, service-corresponding network switch management unit 223, group management unit 225, and a group definition list 226.

Here, "N" is a natural number greater than or equal to unity, and "#1 to #N" indicates the number of the service-corresponding virtual network switch processing unit 222.

The virtual network switch processing unit 221 has a function to perform network switch processing after virtualizing the same. Here, in the virtual network processing unit 220, the constituent parts other than the virtual network switch processing unit 221 are components unique to the present invention.

The service definition list 224 is a list to show definitions for classifying the services. FIG. 2 shows a configuration example of the service definition list 224. According to FIG. 2, the service definition list 224 has a configuration in which an IP address, a port number list, and a virtual machine start-up command are defined for each service identifier. The service definition list 224 is made by an administrator, a management tool, etc., and stored in a nonvolatile disk (not shown) or the like.

In an example shown, in FIG. 2, definitions regarding three services (Service_a, Service_b1, Service_b2) are shown. In other words, each of the virtual machines 300#1 to 300#M provides any of the above three services.

The service identifiers are names for uniquely and individually identifying services to be provided.

A pair of an IP address and a port number list indicates a piece of network address information regarding its own server (the virtual machine server 20) to uniquely distinguish the corresponding service.

In other words, the client terminal 10#L transmits a pair of an IP address and a port number corresponding to a service that the terminal wants to receive as a destination to the virtual machine server 20, and then the virtual machine server 20 recognizes the service that is requested by the client 10#L with reference to the destination and the service definition list 224.

The virtual machine start-up command is a command for starting up the virtual machine 300#M that has a server program 310#M for providing the corresponding service.

The group definition list 226 is a list to show definitions for classifying the groups. FIG. 3 shows a configuration example of the group definition list 226. According to FIG. 3, the group definition list 226 has a configuration in which an IP address list, a port number list, and a corresponding service list are defined for each group identifier. The group definition list 226 is created by an administrator, a management tool, etc., and stored in a nonvolatile disk (not shown) or the like.

A group identifier is a name for uniquely identifying a group to which the client terminal 10#L belongs.

The IP address list indicates information regarding an IP address that the client terminal 10#L uses, and the port number list indicates information regarding a port number that the client terminal 10#L uses. A pair of the IP address list and the port number list becomes information that uniquely identifies the group to which the client terminal 10#L belongs.

The corresponding service list is a list of service identifiers of services that the group can use.

The service-corresponding virtual network switch processing unit 222#N has a function to perform switch processing of a network switch after virtualizing the same for each service defined in the service definition list 224.

The service-corresponding virtual network switch processing unit 222#N is created and terminated by the service-corresponding network switch management unit 223 that will be described later.

In addition, the service-corresponding virtual network switch processing unit 222#N includes a service transfer management table 2221#N and service transfer unit 2222#N.

The service transfer management table 2221#N is a table used for determining a destination virtual transfer machine 300#M for a network-frame transmitted from the client terminal 10#L with reference to the requested service identifier and the group identifier to which the client terminal 10#L belongs.

A configuration example of the service transfer management table 2221#N is shown in FIG. 4. According to FIG. 4, the service transfer management table 2221#N includes service identifiers, group identifiers, virtual machine identifiers, and MAC addresses. The service transfer management table 2221#N includes a virtual machine identifier and a MAC address corresponding to each pair of a service identifier and a group identifier.

Each entry of the service transfer management table 2221#N is added to or deleted from the table by the service-corresponding network switch management unit 223 in accordance with the start-up or termination of the virtual machine 300#M respectively.

The service transfer unit 2222#N has a function to transfer a network-frame with reference to the service transfer management table 2221#N.

The service transfer unit 2222#N examines, with reference to the service definition list 224, whether there is a compatible entry in the service definition list 224 or not by comparing a destination address (an IP address and a port number) included in a network-frame transmitted from the client terminal 10#L with pairs of the IP addresses and port number lists listed on the service definition list 224.

If there is a compatible entry on the service definition list 224, the service transfer unit 2222#N identifies the service identifier of the entry as the service identifier of the service requested by the client terminal 10#L.

In addition, the service transfer unit 2222#N examines, with reference to the group definition list 226, whether there is a compatible entry on the group definition list 226 or not by comparing a source address (an IP address and a port number) included in a network-frame transmitted from the client terminal 10#L with pairs of the IP address lists and port number lists listed on the group definition list 226.

If there is a compatible entry on the group definition list 226, the service transfer unit 2222#N identifies the group identifier of the entry as the group name of the group to which the client terminal 10#L belongs.

In addition, after identifying the service identifier and group identifier corresponding to the network-frame transmitted from the client terminal 10#L, the service transfer unit 2222#N examines, with reference to the service transfer management table 2221#N, whether there is a compatible entry by comparing a pair of the identified service identifier and group identifier with pairs of the service identifiers and the group identifiers listed on the service transfer management table 2221#N.

If there is no compatible entry, the service transfer unit 2222, with reference to the service definition list 224, identifies a virtual machine start-up command corresponding to the identified service identifier, and requires the virtual machine management unit 210 to execute the virtual machine start-up command.

In addition, the service transfer unit 2222#N performs a MAC address translation (MAT) on the network-frame, then transfers the network-frame to a suitable virtual machine 300#M. In addition, the service transfer unit 2222#N performs an ARP (address resolution protocol) processing on the IP address.

In addition, in this embodiment, although the MAC address translation is used, a reverse proxy can be used instead of the MAC address translation.

In this case, each of the virtual machine 300#1 to 300#M has its unique IP address, and accordingly the MAC address column corresponding to the virtual machine 300#M in the service transfer management table 2221#N is replaced with an IP address column.

The service-corresponding network switch management unit 223 has a function to manage creation and termination of the service-corresponding network switch processing unit 222#N.

The service-corresponding network switch management unit 223 creates a service-corresponding virtual network switch processing unit 222#N corresponding to each IP address stored on the service definition list 224.

In addition, when a virtual machine 300#M is newly started up, the service-corresponding network switch management unit 223 connects the virtual machine 300#M to a corresponding service-corresponding virtual network switch processing unit 222#N.

In addition, the service-corresponding network switch management unit 223 has a function to add a new entry to or delete an entry from the service transfer management table 2221#N.

The group management unit 225 has a function to manage users by classifying the users into some groups. The group management unit 225 performs an update and the like on the group definition list 226.

Next, the network configuration will be described. In the network configuration, the NIC 110 of the virtual machine server 20 is connected to a real network, therefore the virtual machine server 20 can receive a network-frame transmitted from a client terminal 10#L.

The virtual network switch processing unit 221 is connected to the NIC 110 and the service-corresponding virtual network switch processing unit 222#N.

The service-corresponding virtual network switch processing unit 222#N is connected to the virtual machine 300#M, and, in response to a service requested from the client terminal 10#L, the server program 310#N of the virtual machine 300#N provides the requested service.

Next, operations of the service providing system 100 according to this exemplary embodiment will be described with reference to the drawings.

Processing operations performed by the virtual machine server 20 on a network-frame transmitted from the client terminal 10#L will be described in detail with reference to FIG. 5. FIG. 5 is flowchart showing processing operations performed by the virtual machine server 20 on a network-frame transmitted from the client terminal 10#L.

Firstly, after receiving a network-frame from the client terminal 10#L (at operation S501), the virtual network switch processing unit 221 transfers, with reference to a destination IP address of a packet included in the network-frame, the network-frame to a service-corresponding virtual network switch processing unit 222#N with the same IP address (at operation S502).

Next, in the service-corresponding virtual network switch processing unit 222#N that receives the network-frame, a service transfer unit 2222#N examines, with reference to a service definition list 224, whether there is a compatible entry on the service definition list 224 or not by comparing a destination address (an IP address and a port number) included in the network-frame with pairs of the IP addresses and port number lists listed on the service definition list 224 (at operation S503).

If there is a compatible entry ("YES" at operation S504), the service transfer unit 2222#N identifies the service identifier of the entry as the service identifier of the service requested by the client terminal 10#L (at operation S505).

If there is no compatible entry ("NO" at operation S504), an error handling is performed and the flow is ended because there is no service requested by the client terminal 10#L (at operation S516).

After the service identifier is identified, the service transfer unit 2222#N examines, with reference to the group definition list 226, whether there is a compatible entry on the group definition list 226 or not by comparing a source address of the packet (an IP address and a port number) included in the network-frame with pairs of the IP address lists and port number lists listed on the group definition list 226 (at operation S506).

If there is a compatible entry ("YES" at operation S507), the service transfer unit 2222#N identifies the group identifier of the entry as the group name of the group to which the client terminal 10#L belongs (at operation S508).

If there is no compatible entry ("NO" at operation S507), because the client terminal 10#L does not belong to any of groups listed on the group definition list 226, the error handling is performed and the flow is ended (at operation S516).

Next, the service transfer unit 2222#N examines, with reference to a service transfer management table 2221#N, whether there is a compatible entry in the service transfer management table 2221#N by comparing a pair of the identified service identifier and group identifier with pairs of the service identifiers and the group identifiers listed on the service transfer management table 2221#N (at operation S509).

If there is no compatible entry ("NO" at operation S510), the service transfer unit 2222#N, with reference to the service definition list 224, identifies a virtual machine start-up command corresponding to the identified service identifier, and requires the virtual machine management unit 210 to execute the virtual machine start-up command to start up a virtual machine (at operation S511). Here, the case where the flow proceeds along the branch "NO" at operation 5510 indicates the situation that there is no virtual machine 300 including a server program 301#M that provides the service requested by the client terminal 10#L.

After the virtual machine 300#M is started up, the service-corresponding virtual network switch management unit 223 connects the started-up virtual machine 300#M to the service-corresponding virtual network switch processing unit 222#N that includes the service transfer unit 2222#N that required the virtual machine to start up (at operation S512).

In addition, the service-corresponding virtual network switch management unit 223 associates the identifier of the started-up virtual machine. 300#M with the MAC address of the virtual NIC 320#M of the virtual machine 300#M, and then adds a new entry to the service transfer management table 2221#N (at operation S513). The service identifier and the group identifier used in this case are respectively a service identifier and a group identifier that are identified in the network-frame that works as a trigger to start up the virtual machine 300#M.

If there is a compatible entry in the service transfer management table 2221#N ("YES" at operation S510), or after the new entry is added to the service transfer management table 2221#N (at operation S513), the service transfer unit 2222#N replaces, with reference to the compatible entry or the added entry, a destination MAC address included in the network-frame with a MAC address of the above entry (at operation S514).

On the other hand, a source MAC address of a network-frame transmitted from the virtual machine 300#M is translated into a MAC address of the service-corresponding virtual network switch processing unit 222#N. These operations are so-called MAC address translations (MATs).

Next, the service transfer unit 2222#N transfers the network-frame to an appropriate virtual machine 300#M (at operation S515).

Here, because the operation regarding the network-frame transmitted from the virtual machine 300#M is not directly associated with the present invention and can be easily conceived by those skilled in the art regarding the present invention, detailed descriptions will be omitted.

Next, this exemplary embodiment will be described with the use of a concrete example.

FIG. 6 is a block diagram showing a configuration of a service providing system 100 according to this example. As for a virtual machine server 20, although only portions regarding a network connection are depicted for the purpose of illustration and other portions are omitted, the configuration of the virtual machine server 20 is the same as that of the virtual machine servers 20 depicted in FIG. 1.

In this example, it is assumed that there are six client terminals, that is, client terminals 10#1 to 10#6, and Group_x, Group_y1, and Group_y2 are composed of the client terminal 10#1 and client terminal 10#2, the client terminal 10#3 and client terminal 10#4, and the client terminal 10#5 and client terminal 10#6 respectively.

An IP address of the client terminal 10#1=[22. 33. 44. 50], and an IP address of the client terminal 10#2=[22. 33. 44. 51].

Group_y1 and Group_y2 establish communication with the outside via a proxy server 30, and use an IP address of the proxy server 30 as their IP addresses. When establishing communication as a proxy of Group_y1, the proxy server 30 uses one of port numbers 1001 to 2000 as its own address, and when establishing communication as a proxy of Group_y2, the proxy server 30 uses one of port numbers 2001 to 3000 as its own address. The group management unit 225 identifies the groups on the basis of the IP addresses and the port numbers with reference to a group definition list 226.

In addition, the service definition list 224 in FIG. 2, the service transfer management table in FIG. 3, and the group definition list 226 in FIG. 4 are used in this exemplary embodiment.

In FIG. 6, a virtual machine 300#1 (VM1), a virtual machine 300#2 (VM2), a virtual machine 300#3 (VM3), and a virtual machine 300#4 (VM4) are operative. The virtual machine 300#1 (VM1) provides Service_a. The virtual machine 300#2 (VM2) also provides Service_a. The virtual machine 300#3 (VM3) provides Service_b1. The virtual machine 300#4 (VM4) provides Service_b2.

Here, the virtual machines 300#1 to 300#4 will be respectively given abbreviations VM1, VM2, VM3, and VM4 for the purpose of explanation in this exemplary embodiment.

Service-corresponding virtual network switch processing units 221#1 and #2 are respectively created by a service-corresponding virtual network switch management unit 223 on the basis of IP addresses defined on the service definition list 224. According to the service definition list 223, because there are two IP addresses ([11. 22. 33. 44] and [11. 22. 33. 55]) on the service definition list, two service-corresponding virtual network switch processing units 222#1 and 222#2 are created. And they respectively have the above corresponding IP addresses.

VM1 to VM4 exist on the basis of service identifiers on the service definition list 224 if necessary, which will be described hereinafter. As for network configuration regarding VM1 to VM4, VM1 to VM3 are connected to the service-corresponding virtual network switch processing unit 222#1, and VM4 is connected to the service-corresponding virtual network switch processing unit 222#2.

According to the service definition list 223 in FIG. 2, Service_a and Service_b1 correspond to the IP address [11. 22. 33. 44]. And Service_b2 corresponds to the IP address [11. 22. 33. 55]. Therefore, in FIG. 6, VM1, VM2, or VM3 that provides Service_a or Service_b1 is connected to the service-corresponding virtual network switch processing unit 222#1 with the IP address [11. 22. 33. 44], and VM4 that provides Service_b2 is connected to the service-corresponding virtual network switch processing unit 222#2 with the IP address [11. 22. 33. 55].

In this case, after a user actually appears, VM1, VM2, VM# or VM4 is created by the service transfer unit 2222#1 or 2222#2 with the use of a compatible virtual machine start-up command with reference to the service definition list 224. After the virtual machine 300#M is created, the virtual machine is given information by which it can be identified (VM1, VM2, VM3, or VM4 in FIG. 6).

Here, VM1, VM2, VM3 or VM4 has the same IP address as that of the service-corresponding virtual network switch processing unit 222#N to which it is connected. In FIG. 6, although the IP addresses of VM1 to VM4 are not depicted, VM1 to VM3 have the IP address [11. 22. 33. 44], and VM4 has the IP address [11. 22. 33. 55].

In addition, the service-corresponding virtual network switch processing unit 222#1, VM1 to VM3 that are connected thereto, the service-corresponding virtual network switch processing unit 222#2, and VM4 that is connected thereto each have individual MAC addresses. These addresses are allocated by a function of the virtual machine system 200 or by an administrator.

For example in FIG. 6, while the service-corresponding virtual network switch processing unit 222#1 has a MAC address [10: 20: 30: 40: 50: 60], VM1 to VM3 that are connected to the service-corresponding virtual network switch processing unit 222#1 respectively have MAC addresses [10: 20: 30: 40: 50: 70], [10: 20: 30: 40: 50: 71], [10: 20: 30: 40: 50: 72].

With reference to service transfer management tables 2221#1 and 2221#2 in FIG. 4, it will be understood that Service_a is provided for Group_x by VM1, and for Group_y1 by VM2 in FIG. 6. In addition, Service_b1 is provided for Group_x by VM3, and Service_b2 is provided for Group_y2 by VM4.

Here, the group definition list 226 in FIG. 3 indicates that Service_b1 can be used by Group_y1. However, FIG. 4 and FIG. 6 indicate that the corresponding virtual machine 300#M is not operative in this example, and neither a client terminal 10#5 nor a client terminal 10#6 in Group_y1 is provided with Service_b1.

Next, advantages of this exemplary embodiment will be described below.

According to this exemplary embodiment, the virtual machines that provide the predetermined services are divided in accordance with the groups into which the client terminals are classified on the basis of a predetermined service each of the client terminals receives, which allows a location in the virtual machine system to which a virtual machine is migrated to be flexibly decided.

In this exemplary embodiment, it is assumed that after a user who wants to receive a service appears, a virtual machine 300#M that has a server program 310#M for providing the service is started up. However, the virtual machine 300#M can be started up in advance.

Next, a hardware configuration example of the virtual machine server 20 according to this exemplary embodiment will be described with reference to FIG. 7. FIG. 7 is a block diagram showing the hardware configuration example of the virtual machine server 20.

According to FIG. 7, the virtual machine server 20 has a similar hardware configuration to that of a typical computer. The virtual machine server 20 includes a CPU (central processing unit) 801, a main storage unit 802, a communication unit 803, an input/output interface unit 804 and a system bus 808. The main storage unit 802 is composed of non-transitory computer-readable media, such as a RAM (random access memory) and the like, and is used as working areas for data and temporary data storage areas. The communication unit 803 transmits or receives data via a network. The input/output interface unit 804 transmits or receives data in connection with an input unit 805, an output unit 806, and a storage unit 807. The system bus 808 connects the above components with each other.

The storage unit 807 is a non-transitory computer-readable medium and can be realized by, for example, a hard disk composed of nonvolatile memories such as ROMs (read only memories) and semiconductor memories.

It goes without saying that the operations of the virtual machine system 200 of the virtual machine server 20 according to the present invention can be hardware-dependently realized by installing circuit components such as LSI (large scale integration) hardware parts including a program. Alternatively, the operations can be realized software-dependently by storing the program that provides the above function in the storage unit 807 and executing the program in the CPU 801 after loading the program in the main storage unit 802.

Although this exemplary embodiment of the present invention has been described in its preferred embodiment, this exemplary embodiment is not limited by the above-described embodiment, and a variety of different embodiments may be made within the technological idea of the present invention.

In addition, an arbitrary combination of the above-described components, or what represents the concept of the present invention in the form of a method, a device, a system, a storage medium, or a computer program may be one of effective embodiment.

The components of the present invention are not necessarily discrete parts, and plural components can be formed in an all-in-one member, one component can be formed by plural members, another component can be part of another component, or part of another component can be overlapped with part of another component.

In addition, although plural procedures are described in a fixed order in the method or program of the present invention, the fixed order does not limit an order in which the plural procedures are actually performed. Therefore, when the method or program of the present invention is executed, the order in which the plural procedures are actually executed can be changed as long as the change does not adversely affects results of performing the procedures.

In addition, it is not always necessary to execute the plural procedures in the method or program of the present invention at different timings individually. Therefore, one procedure can be started during an execution of another procedure, or an execution timing of another procedure can be partly or wholly overlapped with an execution timing of another procedure In addition, part or the entirety of the above embodiment can be described as in the following additional statements, but the present invention is not limited to what are described in these additional statements.

What is claimed is:

1. A service providing system comprising:
    a plurality of virtual machines, each of which provides one or more services;
    a virtual machine system unit which controls the plurality of virtual machines and classifies client terminals which request a service into groups;
    a service transfer management table configured to store entries to identify a virtual machine in association with the service and at least one of the groups; and
    a virtual network switch configured to try to identify, in response to a request of the service from a client terminal of one of the groups, by the service transfer management table, the virtual machine which provides the service for the one of the groups, and configured to transfer the request of the service to the identified virtual machine, wherein:
        the virtual network switch executes a virtual machine start-up command to start up a virtual machine when the identification fails; and
        each entry of the service transfer management table is added or deleted in accordance with start-up of the virtual machine that is started when identification fails or with termination of the identified virtual machine, respectively.

2. The service providing system according to claim 1, the virtual machine system unit classifies the client terminals into the groups according to both IP addresses and port numbers of the client terminals.

3. A service providing method comprising:
    classifying client terminals which request a service into groups;
    identifying a virtual machine which provides one or more services in association with the service and at least one of the groups by referring to a service transfer management table;
    executing a virtual machine start-up command to start up a virtual machine when the identification fails; and
    adding and deleting each entry of the service transfer management table in accordance with start-up of the virtual machine that is started when identification fails or with termination of the identified virtual machine, respectively.

4. The service providing method according to claim 3, in the classifying, the client terminals are classified into the groups according to both IP addresses and port numbers of the client terminals.

5. A non-transitory computer-readable medium having stored thereon a program product that when executed by a processor performs the method comprising:
    classifying client terminals which request a service into groups;
    identifying a virtual machine which provides one or more services in association with the service and at least one of the groups by referring to a service transfer management table;
    executing a virtual machine start-up command to start up a virtual machine when the identification fails; and
    adding and deleting each entry of the service transfer management table in accordance with start-up of the virtual machine that is started when identification fails or with termination of the identified virtual machine, respectively.

6. The non-transitory computer readable medium according to claim 5, in the classifying, the client terminals are classified into the groups according to both IP addresses and port numbers of the client terminals.

* * * * *